United States Patent [19]

Malinowski et al.

[11] 4,399,729
[45] Aug. 23, 1983

[54] APPARATUS FOR SEVERING THE END OF A METAL STRIP WOUND IN A COIL

[75] Inventors: Hans Malinowski; Klaus-Peter Pielsticker, both of Dusseldorf, Fed. Rep. of Germany; Ernst Linsinger, Steyermuhl, Austria

[73] Assignee: SMS Schloemann-Siemag Aktiengesellschaft, Dusseldorf, Fed. Rep. of Germany

[21] Appl. No.: 229,784

[22] Filed: Jan. 30, 1981

[30] Foreign Application Priority Data

Feb. 9, 1980 [DE] Fed. Rep. of Germany ....... 3004952

[51] Int. Cl.³ .......................... B26D 7/02; B26D 1/20
[52] U.S. Cl. ....................................... 83/455; 83/614; 83/649; 242/78.8
[58] Field of Search ................. 83/455, 454, 614, 488, 83/477.2, 649; 242/78.6, 78.7, 78.8

[56] References Cited

U.S. PATENT DOCUMENTS

| 2,525,254 | 10/1950 | Appleby | 242/78.8 |
| 3,635,113 | 1/1972 | Kramer | 83/614 X |
| 3,746,229 | 7/1973 | Feller et al. | 242/78.8 |
| 3,789,279 | 1/1974 | Dempsey et al. | 83/488 |
| 3,821,915 | 7/1974 | Larrable | 83/455 X |
| 4,143,023 | 8/1978 | Addin | 83/614 X |
| 4,246,817 | 1/1981 | Marsh et al. | 83/455 |

Primary Examiner—Donald R. Schran
Attorney, Agent, or Firm—Holman & Stern

[57] ABSTRACT

A cutting apparatus for cutting the unwound end of a coiled strip having a wedge for lifting the coil end away from the coil as the coil is rotated in a direction of unwinding, a strip guide surface for supporting the lifted coil end and a rotary cutting tool movable along a feed guide across the unwound strip thereby severing the unwound strip from the coil without the need to plastically deform the coil by bending. The feed guide may be on a support member, and the support member and the wedge are pivotable independently about an axis parallel to the axis of the coil.

9 Claims, 1 Drawing Figure

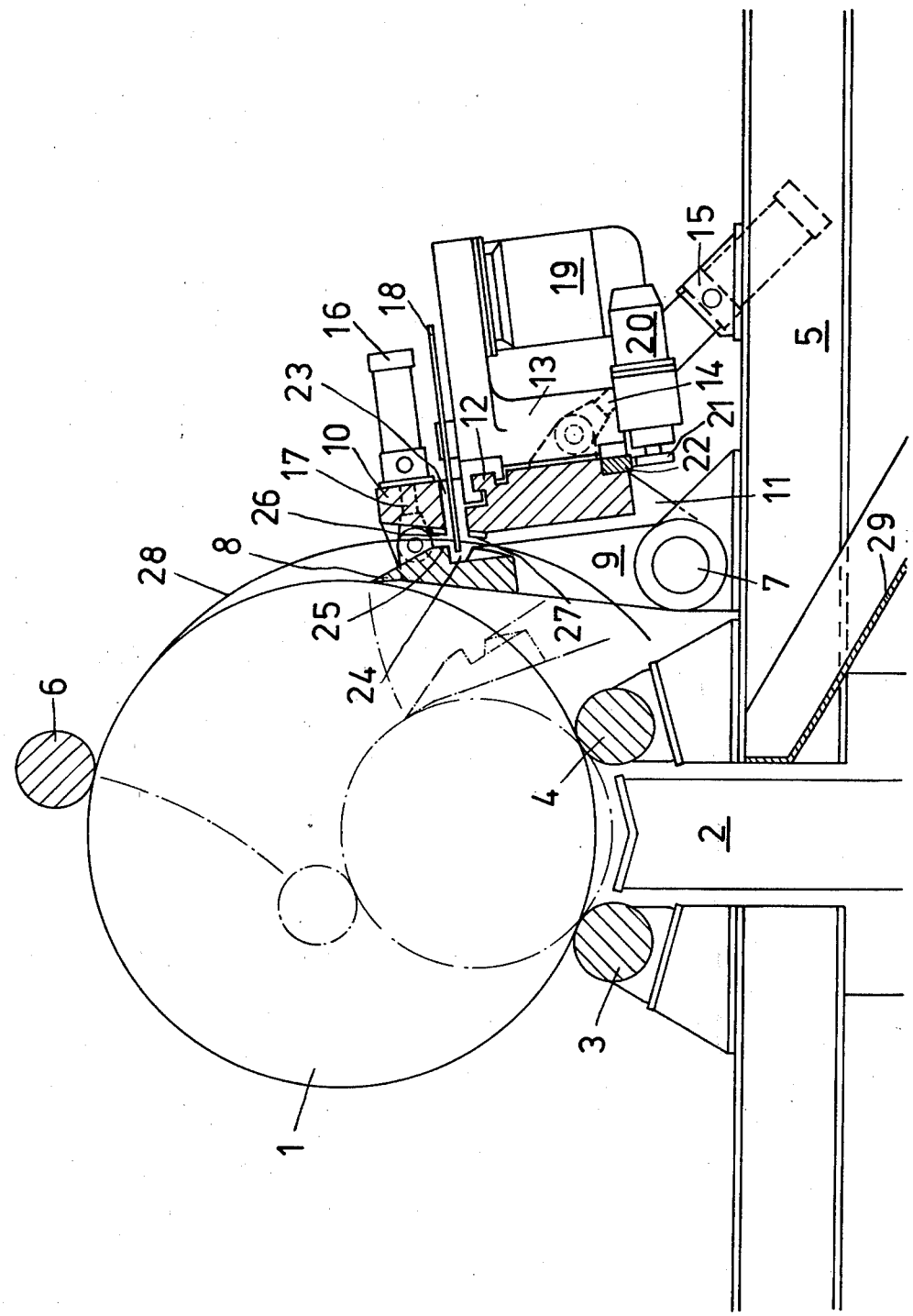

APPARATUS FOR SEVERING THE END OF A METAL STRIP WOUND IN A COIL

BACKGROUND OF THE INVENTION

1. Field of the Invention

This invention relates to apparatus for severing the end of metal strip wound in a coil, e.g. the crop end or a sample strip.

2. Description of the Prior Art

Metal strip coil produced in rolling mills can be transported, bound peripherally, treated and processed more economically when it has a crop or discard end. In order to control the quality of the strip, sample strips are severed from the strip end.

A known apparatus for cropping and for removal of a sample consists of shears which are pivotally mounted on a horizontal axis on a coil rotating device, the frame of the shears having an opening chisel or lifting wedge attached thereto. In this arrangement the strip end lifted off the coil by the wedge is bent with plastic deformation in a direction opposite to the curvature of the coil in a direction onto the shears. The strip end which has been bent away in this way and which no longer lies flat against the coil hinders the subsequent transport and peripheral binding of the coil. When samples are cut off by means of the shears, the plastic deformation as far as the shears influences the quality of the sample strip, e.g. by cold hardening.

BRIEF SUMMARY OF THE INVENTION

An object of the present invention is to provide apparatus in which the above-described disadvantages are avoided, and in particular in which the strip end is subjected to less bending in the direction of the severing device, so that after severing the crop end or a sample, the remaining strip end lies more closely against the surface of the coil.

The invention provides apparatus for severing the end of metal strip wound in a coil, comprising a wedge for lifting the coil end away from the coil as the coil is rotated in a direction of unwinding, a strip guide surface on the wedge for supporting the lifted coil end, and a rotary cutting tool movable by means of a drive along a feed guide across the unwound strip supported on the strip guide surface thereby severing the unwound strip from the coil.

In this way the required spacing of the cut from the surface of the coil, and thus the bending of the strip end away from the coil, is no longer determined by the space requirement of the cutting device, but merely by the shape and the adjustment of the wedge. Thus in most cases the necessary bending can occur within the elastic range without cold hardening. Within this range, the end of the cropped strip automatically returns to lie flat against the coil, so that the further transport and peripheral binding of the coil can be effected in a trouble-free manner.

Preferably, the feed guide is on a support member movable towards the axis of rotation of the coil, the feed guide carrying a cutter support mounting the rotary cutting tool, and a drive for rotating the rotary cutting tool. It is thus possible to move the cutter support always closely to the lifting wedge when the coil diameter changes.

Preferably, the support member and the wedge are pivotable by pivoting means about a pivot axis extending parallel to the axis of the coil.

It is of particular advantage if the support member and the wedge are pivotable separately about the pivot axis and are inter-connected by a power device provided with clamping faces for clamping the lifted coil end against the strip guide surface.

Preferably, the wedge is provided with a recess for accommodating the edge of the rotary cutting tool during cutting of the coil ends and the clamping faces are arranged on either side of the recess. In this case the clamping faces are advantageously arranged on both sides of the recess. For the purpose of obtaining uniform clamping, at least one clamping face may be mounted with a resilient bias.

Preferably, the support member carries a toothed rack engaged by a pinion driven by a feed motor mounted on the cutter support for moving the cutter support, and hence the rotary cutting tool, across the strip end. The rotary cutting tool may be a milling disc.

BRIEF DESCRIPTION OF THE DRAWING

Apparatus for severing the end of a metal strip wound in a coil which is supported on a rotating device in accordance with the invention is shown in cross-section by way of example in the accompanying drawing.

DETAILED DESCRIPTION

In the drawing, driven bottom rollers 3, 4 are mounted on a base member 5, and are arranged on opposite sides of a coil conveyor 2 so as to project thereabove. An upper pressure roller 6 is adjustable to the diameter of a coil 1 on the coil conveyor 2.

A pivot axle 7 is mounted on the base member 5 parallel to the axis of rotation of the coil 1, and a lifting wedge or blade 8 carried by side arms 9, is pivotably mounted on the axle 7. A support member 10 carried by arms 11 is pivotable on the axle 7 independently of the wedge 8. The support member 10 has a guide 12 extending parallel to the axis of the coil 1 for receiving a cutter support 13. One of the arms 11 of the support member 10 is pivotally connected to a piston rod 14 of an adjusting cylinder 15, which is pivotally anchored to the base member 5. Two cylinders 16 mounted on the support member 10 are connected to the wedge 8 by means of the piston rods 17.

A rotary cutting tool 18 is mounted on the cutter support 13, transversely of the coil 1, and is driven by a motor 19. The rotary cutting tool 18 may, for example, be a milling disc or a cutting grinding disc. A motor 20 carrying a pinion 21 is mounted on the cutter support 13, the pinion 21 engaging with teeth of a toothed rack 22 attached to the support member 10. Actuation of motor 20 moves the cutter support 13, and hence the cutting tool 18 parallel to the axis of the coil 1.

A slot 23 is provided in the support member 10 for the passage of the rotary cutting tool 18. A corresponding recess 24 is provided in a strip guide surface 25 of the chisel blade 8. Clamping faces 26, 27 are arranged on the support member 10 on opposite sides of the slot 23, so that the strip 28 is pressed thereby against the strip guide surface 25 of the wedge 8. So that the strip may be clamped uniformly on both sides of the slot 23 one or other of the clamping faces 26, 27 may be resiliently mounted on the guide 10. Alternatively, both clamping faces 26, 27 may be pivotally mounted on a rocker, but this construction has not been shown in the drawing.

In order to open a coil 1, the cutter support 13 is first displaced laterally beyond the end of the coil 1 by means of the feed drive 20, 21. The strip end of the coil 1 is then rotated clockwise against the opening wedge by rotating the bottom rollers 3, 4 in a counter clockwise direction. The strip end thus travels over the strip guide surface 25 of the lifting wedge 8 and is lifted away from the coil with minimum bending. As soon as the intended part of the strip 28 has reached the cutting path formed by the slot 23, the cylinders 16 are actuated to move the clamping faces 26, 27 so that the strip 28 is clamped against the strip guide surface 25. The rotary cutting tool 18 driven by the motor 19 is then moved across the strip by the feed motor 20. The severed crop end, or sample strip, is conveyed away by means of a slide 29.

We claim:

1. Apparatus for severing the end of metal strip wound in a coil comprising a base member, means on said base member for rotatably supporting said coil of metal strip, a wedge mounted in an operative position with respect to said coil for lifting the coil end away from but closely adjacent the coil as the coil is rotated in a direction of unwinding, a strip guide surface on said wedge for supporting the lifted coil end closely adjacent the coil, a rotary cutting tool, a cutting tool feed guide mounted in an operative position with respect to said coil and cooperatively engaging said rotary cutting tool so that said cutting tool is movable in a direction substantially transverse to the unwound strip supported on the strip guide surface to thereby sever the unwound strip from the coil, a drive means for moving said rotary cutting tool along said feed guide and a drive means for rotating said cutting tool.

2. Apparatus according to claim 1, wherein said feed guide is on a support member movable towards and away from said coil, and further comprising a cutting tool support cooperatively engaging said feed guide, said rotary cutting tool being mounted on said cutting tool support.

3. Apparatus according to claim 2, wherein said feed guide support member and said wedge are pivotably mounted on pivoting means which pivot about a pivot axis extending parallel to the axis of rotation of the coil.

4. Apparatus according to claim 3, wherein said support member and wedge are pivotable separately about said pivot axis and are interconnected by a power device for producing relative movement therebetween, and further comprising clamping faces on said support member for clamping the lifted coil end against said strip guide surface.

5. Apparatus according to claim 4, wherein said wedge is provided with a recess for accommodating the cutting edge of said rotary cutting tool during cutting of the coil ends, and clamping faces are arranged on opposite sides of said cutting tool.

6. Apparatus according to claim 2, wherein said drive means for moving said rotary cutting tool along said feed guide comprises a toothed rack provided on said support member, a feed motor having an output shaft mounted on said cutting tool support, and a pinion mounted on said shaft operatively engaging said rack.

7. Apparatus according to claim 1, wherein said rotary cutting tool is a milling disc.

8. Apparatus as claimed in claim 5 wherein said pivoting means comprises at least one wedge pivot arm pivotally mounted at one end on said base member and having said wedge supported at the other end, and at least one support member pivot arm pivotally mounted on said base member, said power device comprises at least one piston-cylinder unit having the cylinder mounted on said support member and the outer end of the piston operatively connected to said wedge, and further comprising a support member adjusting piston-cylinder unit having the cylinder thereof pivotally mounted on said base member and the outer end of the piston thereof pivotally connected to said support member so that operation of said support member adjusting piston-cylinder unit will move said support member, rotary cutting tool and wedge relatively to said coil about said pivot axis.

9. Apparatus as claimed in claim 8 wherein said feed guide comprises an elongated support for slidably supporting said cutting tool support extending substantially parallel to the rotational axis of said coil and further comprising said cutting tool support is slidably supported on said elongated support, a slot is provided through said support member adjacent said recess in said wedge, said cutting tool is a cutting disc extending through said slot, said clamping faces are provided on both sides of said slot, and said drive means for moving said rotary cutting tool along said feed guide comprises a toothed rack supported on said support member extending substantially parallel to said feed guide, a feed motor mounted on said cutting tool support and having an output shaft extending therefrom, and a pinion mounted on said output shaft operatively engaging said toothed rack so that operation of said feed motor controls the movement of said cutting tool transversely to the unwound strip.

* * * * *